(12) United States Patent
Yaghi et al.

(10) Patent No.: US 8,674,128 B2
(45) Date of Patent: Mar. 18, 2014

(54) CONDUCTIVE ORGANOMETALLIC FRAMEWORK

(75) Inventors: Omar M. Yaghi, Los Angeles, CA (US); Eunwoo Choi, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 53 days.

(21) Appl. No.: 13/144,905

(22) PCT Filed: Jan. 15, 2010

(86) PCT No.: PCT/US2010/021201
§ 371 (c)(1),
(2), (4) Date: Sep. 30, 2011

(87) PCT Pub. No.: WO2010/083418
PCT Pub. Date: Jul. 22, 2010

(65) Prior Publication Data
US 2012/0017668 A1    Jan. 26, 2012

Related U.S. Application Data (60) Provisional application No. 61/144,742, filed on Jan. 15, 2009.

(51) Int. Cl.
*C07F 15/00*    (2006.01)
*C07F 11/00*    (2006.01)

(52) U.S. Cl.
USPC ............................................ 556/136; 556/58

(58) Field of Classification Search
None
See application file for complete search history.

(56) References Cited

U.S. PATENT DOCUMENTS

| | | | |
|---|---|---|---|
| 4,532,225 A | 7/1985 | Tsao et al. |
| 5,160,500 A | 11/1992 | Chu et al. |
| 5,208,335 A | 5/1993 | Ramprasad et al. |
| 5,648,508 A | 7/1997 | Yaghi |
| 5,733,505 A | 3/1998 | Goldstein et al. |
| 6,479,447 B2 | 11/2002 | Bijl et al. |
| 6,501,000 B1 | 12/2002 | Stilbrany et al. |
| 6,617,467 B1 | 9/2003 | Muller et al. |
| 6,624,318 B1 | 9/2003 | Mueller et al. |
| 6,893,564 B2 | 5/2005 | Mueller et al. |
| 6,929,679 B2 | 8/2005 | Mueller et al. |
| 6,930,193 B2 | 8/2005 | Yaghi et al. |
| 7,196,210 B2 | 3/2007 | Yaghi et al. |
| 7,202,385 B2 | 4/2007 | Mueller et al. |

(Continued)

FOREIGN PATENT DOCUMENTS

DE    102005023856 A1    11/2006
EP        1674555 A1     6/2006

(Continued)

OTHER PUBLICATIONS

R. Tannenbaum, J Mol Catal A: Chem 107 (1996) 207-215.*

(Continued)

*Primary Examiner* — Johann R. Richter
*Assistant Examiner* — Kofi Adzamli
(74) *Attorney, Agent, or Firm* — Joseph R. Baker, Jr.; Gavrilovich, Dodd & Lindsey LLP (57) ABSTRACT

The disclosure provides organometallic frameworks, catalysts and sensors. In one aspect, the organometallic framework comprises di-isocyanide group.

9 Claims, 2 Drawing Sheets

(56) References Cited

U.S. PATENT DOCUMENTS

| | | | |
|---|---|---|---|
| 7,279,517 | B2 | 10/2007 | Mueller et al. |
| 7,309,380 | B2 | 12/2007 | Mueller et al. |
| 7,343,747 | B2 | 3/2008 | Mueller et al. |
| 7,411,081 | B2 | 8/2008 | Mueller et al. |
| 7,524,444 | B2 | 4/2009 | Hesse et al. |
| 7,582,798 | B2 | 9/2009 | Yaghi et al. |
| 7,652,132 | B2 | 1/2010 | Yaghi et al. |
| 7,662,746 | B2 | 2/2010 | Yaghi et al. |
| 7,799,120 | B2 | 9/2010 | Yaghi et al. |
| 7,815,716 | B2 | 10/2010 | Mueller et al. |
| 2003/0004364 | A1 | 1/2003 | Yaghi et al. |
| 2003/0078311 | A1 | 4/2003 | Muller et al. |
| 2003/0148165 | A1 | 8/2003 | Muller et al. |
| 2003/0222023 | A1 | 12/2003 | Mueller et al. |
| 2004/0081611 | A1 | 4/2004 | Muller et al. |
| 2004/0225134 | A1 | 11/2004 | Yaghi et al. |
| 2004/0249189 | A1 | 12/2004 | Mueller et al. |
| 2004/0265670 | A1 | 12/2004 | Muller et al. |
| 2005/0004404 | A1 | 1/2005 | Muller et al. |
| 2005/0014371 | A1 | 1/2005 | Tsapatsis |
| 2005/0124819 | A1 | 6/2005 | Yaghi et al. |
| 2005/0154222 | A1 | 7/2005 | Muller et al. |
| 2005/0192175 | A1 | 9/2005 | Yaghi et al. |
| 2006/0057057 | A1 | 3/2006 | Muller et al. |
| 2006/0135824 | A1 | 6/2006 | Mueller et al. |
| 2006/0154807 | A1 | 7/2006 | Yaghi et al. |
| 2006/0185388 | A1 | 8/2006 | Muller et al. |
| 2006/0252641 | A1 | 11/2006 | Yaghi et al. |
| 2006/0252972 | A1 | 11/2006 | Pilliod et al. |
| 2006/0287190 | A1 | 12/2006 | Eddaoudi et al. |
| 2007/0068389 | A1 | 3/2007 | Yaghi et al. |
| 2007/0202038 | A1 | 8/2007 | Yaghi et al. |
| 2008/0017036 | A1 | 1/2008 | Schultink et al. |
| 2008/0184883 | A1 | 8/2008 | Zhou et al. |
| 2009/0155588 | A1 | 6/2009 | Hesse et al. |
| 2010/0132549 | A1 | 6/2010 | Yaghi et al. |
| 2010/0143693 | A1 | 6/2010 | Yaghi et al. |
| 2010/0186588 | A1 | 7/2010 | Yaghi et al. |
| 2010/0286022 | A1 | 11/2010 | Yaghi et al. |
| 2011/0137025 | A1 | 6/2011 | Yaghi et al. |

FOREIGN PATENT DOCUMENTS

| | | | |
|---|---|---|---|
| WO | 2004101575 | A2 | 11/2004 |
| WO | 2006072573 | A2 | 7/2006 |
| WO | 2006116340 | A1 | 11/2006 |
| WO | 2007054581 | A1 | 5/2007 |
| WO | 2007101241 | A2 | 9/2007 |
| WO | 2007111739 | A2 | 10/2007 |
| WO | 2008091976 | A1 | 7/2008 |
| WO | 2008138989 | A1 | 11/2008 |
| WO | 2008140788 | A1 | 11/2008 |
| WO | 2009020745 | A9 | 2/2009 |
| WO | 2009042802 | A1 | 4/2009 |
| WO | 2009056184 | A1 | 5/2009 |
| WO | 2009149381 | A3 | 12/2009 |
| WO | 2010078337 | A1 | 7/2010 |
| WO | 2010088629 | A1 | 8/2010 |
| WO | 2010090683 | A1 | 8/2010 |
| WO | 2010148276 | A3 | 12/2010 |
| WO | 2010148296 | A3 | 12/2010 |
| WO | 2010148374 | A3 | 12/2010 |
| WO | 2011014503 | A1 | 2/2011 |
| WO | 2011038208 | A2 | 3/2011 |

OTHER PUBLICATIONS

Nickitas-Etienne, Athina, International Preliminary Report on Patentability and Written Opinion, Date of Issuance of Report: Jan. 19, 2010, International Application No. PCT/US08/70149.

Nickitas-Etienne, Athina. International Preliminary Report on Patentability for PCT/US2008/07741. Date of issuance of this report: Mar. 30, 2010.

Nickitas-Etienne, Athina, International Preliminary Report on Patentability for PCT/US2009/068731. Date of Issuance of the Report: Jun. 21, 2011.

Nickitas-Etienne, Athina. International Preliminary Report on Patentability for PCT/US2009/068849. Date of Mailing: Jun. 30, 2011.

Oisaki et al., "A Metal-Organic Framework with Covalently Bound Organometallic Complexes," J. Am. Chem. Soc. 132:9262-9264 (2010).

O'Keefe et al., "Germanate Zeolites: Contrasting the Behavior of Germanate and Silicate Structures Built from Cubic T8O20 units (T = Si or Ge)," Chem. Eur. J. 5:2796-2801 (1999).

O'Keefe et al., "Frameworks for Extended Solids: Geometrical Design Principles," J. Solid State Chem. 152:3-20 (2000).

Okeeffe et al., "Reticular Chemistry—Present and Future Prospects—Introduction," J. Solid State Chem.178:V-VI (2005).

O'Keeffe et al., "The Reticular Chemistry Structure Resource (RCSR) Database of, and Symbols for, Crystal Nets," Acc. Chem. Res. 41:1782-1789 (2008).

Park, Kyo Sung et al., "Exceptional chemical and thermal stability of zeolitic imidazolate frameworks," Proc. Natl. Acad. Sci., Jul. 5, 2006, pp. 10186-10191, vol. 103, No. 27.

Park, Jae Woo. International Search Report for PCT/US2010/039123. Date of Mailing: Feb. 24, 2011.

Patteux, Claudine. International Search Report for PCT/US2010/043373. Date of Mailing: Oct. 10, 2010.

Pawsey et al., "Hyperpolarized 129Xe Nuclear Magnetic Resonance Studies of Isoreticular Metal-Organic Frameworks," Phys. Chem. 111:6060-6067 (2007).

Phan et al., "Synthesis, Structure, and Carbon Dioxide Capture Properties of Zeolitic Imidazolate Frameworks," Acc. Chem. Res 43:58-67 (2009).

Phan et al., "Metal-Organic Frameworks of Vanadium as Catalysts for Conversion of Methane to Acetic Acid," Inorg. Chem. 50:7388-7390 (2011).

Plevert et al., "A Flexible Germanate Structure Containing 24-Ring Channels With Very Low Framework Density," J. Am. Chem. Soc. 123:12706-12707 (2001).

Plevert et al., "Synthesis and Characterization of Zirconogermanates," Inorg. Chem., 42:5954-5959 (2003).

Plevert et al., "Layered Structures Constructed from New Linkages of Ge7(O,OH,F)19 Clusters," Chem. Mater. 15:714-718 (2003).

Reineke et al., "From Condensed Lanthanide Coordination Solids to Microporous Frameworks Having Accessible Metal Sites," J. Am. Chem. Soc 121:1651-1657 (1999).

Reineke et al., "A Microporosity of Lanthanide-Organic Frameworks," Angew. Chem. Int. Ed. 38:2590-2594 (1999).

Reineke et al., "Large Free Volume in Interpenetrating Networks: The Role of Secondary Building Units Exemplified by Tb2(ADB)3[(CH3)2SO]4-16[(CH3)2SO]," J. Am. Chem. Soc. 122:4843-4844 (2000); Featured in Science Magazine, Editors Choice (Nov. 2000).

Rosi et al., "Infinite Secondary Building Units and Forbidden Catenation in Metal-Organic Frameworks," Angew. Chem. Int. Ed. 41:294-297 (2002).

Rosi et al., "Advances in the Chemistry of Metal-Organic Frameworks," CrystEngComm 4:401-404 (2002).

Rosi et al., "Hydrogen Storage in Microporous Metal-Organic Frameworks," Science 300:1127-1129 (2003); Featured in (1) Chemical & Engineering News magazine, May 19, 2004, and (2) Technology Research News Magazine, May 21, 2003.

Rosi et al., "Rod-Packings and Metal-Organic Frameworks Constructed from Rod-Shaped Secondary Building Units," J. Am. Chem. Soc. 127:1504-1518 (2005).

Rowsell et al., "Hydrogen Sorption in Functionalized Metal-Organic Frameworks," J. Am. Chem. Soc.126: 5666-5667 (2004).

Rowsell et al., "Metal-Organic Frameworks: A New Class of Porous Materials," Microporous Mesoporous Mater. 73:3-14 (2004).

Rowsell et al., "Strategies for Hydrogen Storage in Metal-Organic Frameworks," Angew. Chem. Int. Ed. 44: 4670-4679 (2005).

Rowsell et al., "Gas Adsorption Sites in a Large-Pore Metal-Organic Framework," Science 309:1350-1354 (2005).

Rowsell et al., "Characterization of H2 Binding sites in prototypical metal-organic frameworks by inelastic neutron scattering," J. Am. Chem. Soc. 127:14904-14910 (2005).

(56) References Cited

OTHER PUBLICATIONS

Rowsell et al., "Effects of Functionalization, Catenation, and Variation of the Metal Oxide and Organic Linking Units on the Low-Pressure Hydrogen Adsorption Properties of Metal-Organic Frameworks," J. Am. Chem. Soc. 128: 1304-1315 (2006).
Siberio-Perez, "Raman Spectroscopic Investigation of CH4 and N2 Adsorption in Metal-Organic Frameworks," Chem. Mater. 19:3681-3685 (2007).
Smaldone et al., "Metal-Organic Frameworks from Edible Nature Products," Angew. Chem. Int. Ed. 49:8630-8634 (2010).
Spencer et al., "Determination of the Hydrogen Absorption Sites in Zn4O(1,4-benzenedicarboxylate) by Single Crystal Neutron Diffraction," Chem. Commun. 3:278-280 (2006); Epub Dec. 6, 2005.
Stallmach et al., "NMR Studies on the Diffusion of Hydrocarbons on the Metal-Organic Framework Material MOF-5," Angew. Chem. Int. Ed. 45:2123-2126 (2006).
Sudik et al., "Design, Synthesis, Structure, and Gas (N2, Ar, CO2, CH4 and H2) Sorption Properties of Porous Metal-Organic Tetrahedral and Heterocuboidal Polyhedra," J. Am. Chem. Soc. 127:7110-7118 (2005).
Sudik et al., "Metal-Organic Frameworks Based on Trigonal Prismatic Building Blocks and the New "acs" Topology," Inorg. Chem. 44:2998-3000 (2005).
Sudik et al., "A Metal-Organic Framework with a Hierarchical System of Pores and Tetrahedral Bbuilding Blocks," Angew. Chem. Int. Ed. 45:2528-2533 (2006).
Tranchemontagne et al. "Metal-Organic Frameworks with High Capacity and Selectivity for Harmful Gases," Proc. Natl. Acad. Sci. USA 105:11623-11627 (2008).
Tranchemontagne et al., "Reticular Chemistry of Metal-Organic Polyhedra," Angew. Chem. Int. Ed., 2008, 47:5136-5147 (2008).
Tranchemontagne et al., "Room Temperature Synthesis of Metal-organic Frameworks: MOF-5, MOF-74, MOF-177, MOF-199, and IRMOF-0," Tetrahedron 64:8553-8557 (2008).
Tranchemontagne et al. "Secondary Building Units, Nets and Bonding in the Chemistry of Metal-Organic Frameworks," Chem. Soc. Rev. 38:1257-1283 (2009).
Uribe-Romo et al., "A Crystalline Imine-Linked 3-D Porous Covalent Organic Framework," J. Am. Chem. Soc. 131:4570-4571 (2009).
Uribe-Romo et al., "Crystalline Covalent Organic Frameworks with Hydrazone Linkages," J. Am. Chem. Soc. 133: 11478-11481 (2011).
Vairaprakash et al., "Synthesis of Metal-Organic Complex Arrays," J. Am. Chem. Soc. 133:759-761 (2011).
Valente et al., "Metal-organic Frameworks with Designed Chiral Recognition Sites," Chem. Commun. 46: 4911-4913 (2010).
Vodak et al., "Metal-Organic Frameworks Constructed from Pentagonal Antiprismatic and Cuboctahedral Secondary Building Units," Chem. Commun. 2534-2535 (2001).
Vodak et al., "Computation of Aromatic C3N4 Networks and Synthesis of the Molecular Precursor N(C3N3)3C16," Chem. Eur. J. 9:4197-4201 (2003).
Walton et al., "Understanding Inflections and Steps in Carbon Dioxide Adsorption Isotherms in Metal-Organic Frameworks," J. Am. Chem. Soc. 130:406-407 (2008).
Wang et al., "Postsynthetic Covalent Modification of a Neutral Metal-Organic Framework," J. Am. Chem. Soc. 129 (41):12368-12369 (2007).
Wang et al., "Colossal Cages in Zeolitic Imidazolate Frameworks as Selective Carbon Dioxide Reservoirs," Nature 453:207-211 (2008).
Wang et al., "Tandem Modification of Metal-Organic Frameworks by a Postsynthetic Approach," Angew. Chem. Int. 47:4699-4702 (2008).
Wong-Foy, AG et al., "Exceptional H2 saturation uptake in microporous metal-organic frameworks" J. Am. Chem. Soc., 2006, 128, pp. 3494-3495.
Yaghi et al., "Selective binding and removal of guests in a microporous metal-organic framework," Nature, Dec. 1995, pp. 703-706, vol. 378.
Yaghi et al., "Conversion of Hydrogen-Bonded manganese(II) and zinc(II) squarate (C4O42-) molecules, Chains, and Sheets to 3-D Cage Networks," J. Chem. Soc., Dalton Trans., 1995, 727-732.
Yaghi et al., "Presence of Mutually Interpenetrating Sheets and Channels in the Extended Structure of Cu(4,4'-Bipyridine)Cl," Angew. Chem. Int. Ed. Engl., 1995, 34, 207-209.
Yaghi et al., "The Utility of Polymeric Matrices in the Preparation of Single Crystals of Coordination Solids: Synthesis and Structure of CuII(1,4-C4H4N2)(C4O4)(OH2)4," J. Solid State Chem., 1995, 117, 256-260.
Yaghi et al., "Open-Framework Solids with Diamond-Like Structures Prepared from Clusters and Metal-Organic Building Blocks," Mater. Res. Soc. Symp. Proc., 1995, 371, 15.
Yaghi et al., "Hydrothermal Synthesis of a Metal-Organic Framework Containing Large Rectangular Channels," J. Am. Chem. Soc., 1995, 117, 10401-10402.
Yaghi et al., "Construction of Microporous Materials from Molecular Building Blocks," Fundamental Materials Research, T. J. Pinnavaia and M. F. Thorpe, eds., vol. II, Plenum: New York, p. 111 (1995).
Yaghi et al., "T-Shaped Molecular Building Units in the Porous Structure of Ag(4,4'-bpy) NO3," J. Am. Chem. Soc., 1996, 118, 295-296.
Yaghi et al., "Construction of Porous Solids from Hydrogen-Bonded Metal Complexes of 1,3,5-Benzenetricarboxylic Acid," J. Am. Chem. Soc., 1996, 118, 9096-9101.
Yaghi et al., "Conversion of Molecules and Clusters to Extended 3-D Cage and Channel Networks," Metal Containing Polymeric Materials, C. U. Pittman, C. E. Carraher, B. M. Culbertson, M. Zeldin, J. E. Sheets, Eds., Plenum: New York, p. 219 (1996).
Yaghi et al., "Selective Guest Binding by Tailored Channels in a 3-D Porous Zinc(II)-1,3,5-Benzenetricarboxylate Network," J. Am. Chem. Soc., 1997, 119, 2861-2868.
Yaghi et al., "Crystal Growth of Extended Solids by Nonaqueous Gel Diffusion," Chem. Mater., 1997, 9, 1074-1076.
Yaghi et al., "A Molecular Railroad with Large Pores: Synthesis and Structure of Ni(4,4'-bpy)2.5(H2O)2(ClO4)2•1.5 (4,4'-bpy)2(H2O)," Inorg. Chem., 1997, 36, 4292-4293.
Yaghi et al., "Construction of a New Open-Framework Solid form 1,3,5-Cyclohexanetricarboxylate and Zinc(II) Building Blocks," J. Chem. Soc. Dalton Trans. 2383-2384 (1997).
Yaghi et al., "Synthesis and Structure of a Metal-Organic Solid Having the Cadmium (II) Sulfate Net," Mater. Res. Soc. Symp. Proc. 453:127 , (1997).
Yaghi et al., "Designing Microporosity in Coordination Solids," Modular Chemistry, J. Michl, Ed., Kluwer: Boston, p. 663 (1997).
Yaghi et al., "Synthetic Strategies, Structure Patterns, and Emerging Properties in the Chemistry of Modular Porous Solids," Acc. Chem. Res. 31:474-484 (1998).
Yaghi et al., "Transformation of Germanium Dioxide to 4-Connected Porous Germanate Net," J. Am. Chem. Soc., 20:10569-10570 (1998).
Yaghi et al., "Design of Solids from Molecular Building Blocks: Golden Opportunities for Solid State Chemistry," J. Solid State Chem. 152, 1-2 (2000).
Yaghi et al., "A Molecular World Full of Holes," Chem. Innov. p. 3 (2000).
Yaghi et al., "Reticular Synthesis and the Design of New Materials," Nature 423:705-714 (2003).
Yaghi, Omar., "Porous Crystals for Carbon Dioxide Storage," slide presentation at the Fifth Annual Conference on Carbon Capture & Sequestration, US Department of Energy on May 10, 2006 http://www.netl.doe.gov/publications/proceedings/06/carbon-seq/Tech%20Session%20193.pdf.
Yaghi, Omar, "Hydrogen Storage in Metal-Organic Frameworks," slide presentation to DOE Hydrogen Program 2007 Annual Merit Review, US Department of Energy, on May 15, 2007 at http://www.hydrogen.energy.gov/pdfs/review07/st_10_yaghi.pdf.
Yaghi et al., "Metal-Organic Frameworks: A Tale of Two Entanglements," Nature materials 6:92-93 (2007).
Yaghi et al., "Reticular Chemistry and Metal-Organic Frameworks for Clean Energy," MRS Bulletin 34:682-690 (2009).
Young, Lee W., International Search Report and Written Opinion, Date of Mailing of Report: May 7, 2008, International Application No. PCT/US08/51859.
Young, Lee W., "International search Report and Written Opinion," PCT/US08/06008, United States Patent & Trademark Office, Aug. 20, 2008.

(56) References Cited

OTHER PUBLICATIONS

Young, Lee W., International Search Report and Written Opinion, Date of Mailing: Dec. 2, 2008, International Application No. PCT/US08/77741.

Young, Lee W., International Search Report and Written Opinion, Date of Mailing: Jan. 12, 2009, International Application No. PCT/US08/70149.

Young, Jung Doo. International Search Report for PCT/US2010/050170. Date of Mailing: Jun. 8, 2011.

Zhang et al., "Docking in Metal-Organic Frameworks," Science 325:855-859 (2009).

Zhao et al., "Rigid-Strut-Containing Crown Ethers and [2]Catenanes for Incorporation into Metal-Organic Frameworks," Chem. Eur. J. 15:13356-13380 (2009).

Zhofu et al., "A Nearly Planar Water Sheet Sandwiched between Strontium-Imidazolium Carboxylate Coordination Polymers," Inorg. Chem. 44:5200-5202 (2005).

Andrew et al., "Post-Synthetic Modification of Tagged MOFs," Angew. Chem. Int. Ed. 47:8482-8486 (2008).

Baharlou, Simin. International Preliminary Report on Patentability for PCT/US2009/046463. Date of Mailing: Dec. 16, 2010.

Banerjee et al., "High-Throughput Synthesis of Zeolitic Imidazolate Frameworks and Application to CO2 Capture," Science 319:939-943 (2008).

Banerjee et al., "Control of Pore Size and Functionality in Isoreticular Zeolitic Imidazolate Frameworks and their Carbon Dioxide Selective Capture Properties," J. Am. Chem. Soc. 131:3875-3877 (2009).

Barman et al., "Azulene Based Metal-Organic Frameworks for Strong Adsorption of H2," Chem. Commun. 46: 7981-7983 (2010).

Barton et al., "Tailored Porous Materials," Chem. Mater. 11:2633-2656 (1999).

Bloch et al., "Metal Insertion in a Microporous Metal-Organic Framework Lined with 2,2'-Bipyridine" J. Am. Chem. Soc. 132:14382-14384 (2010).

Braun et al., "1,4-Benzenedicarboxylate Derivatives as Links in the Design of Paddle-Wheel Units and Metal-Organic Frameworks," Chem. Commun. 24:2532-2533 (2001).

Britt et al., "Highly efficient separation of carbon dioxide by a metal-organic framework replete with open metal sites," Proc. Natl. Acad. Sci. USA 106:20637-20640 (2009).

Carlucci, Lucia et al., "Polycatenation, polythreading and polyknotting in coordination network chemistry" Coordination Chemistry Reviews 246, 2003, pp. 247-289.

Caskey et al., "Dramatic Tuning of CO2 Uptake via Metal Substitution in a Coordination Polymer with Cylindrical Pores," JACS 130(33):10870-10871 (2008).

Caskey et al., "Selected Applications of Metal-Organic Frameworks in Sustainable Energy Technologies," Material Matters 4.4:111 (2009).

Centrone et al., "Raman Spectra of Hydrogen and Deuterium Adsorbed on a Metal-Organic Framework," Chem. Phys. Lett. 411:516-519 (2005).

Chae et al., "Tertiary Building Units: Synthesis, Structure, and Porosity of a Metal-Organic Dendrimer Framework (MOD-1)," J. Am. Chem. Soc. 123:11482-11483 (2001).

Chae et al., "Design of Frameworks with Mixed Triangular and Octahedral Building Blocks Exemplified by the Structure of [Zn4O(TCA)2] Having the Pyrite Topology," Angew. Chem. Int. Ed. 42:3907-3909 (2003).

Chae et al., "A Route to High Surface Area, Porosity and Inclusion of Large Molecules in Crystals," Nature 427, 523-527 (2004); Featured in (1) Chemical & Engineering News magazine, Feb. 9, 2004, (2) BBC World Service, Feb. 4, (3) New Scientist, Feb. 4.

Chen et al., "Cu2(ATC)6H2O: Design of Open Metal Sites in Porous Metal-Organic Crystals (ATC: 1,3,5,7-adamantane tetracarboxylate)," J. Am. Chem. Soc. 122:11559-11560 (2000).

Chen et al., "Interwoven Metal-Organic Framework on a Periodic Minimal Surface with Extra-Large Pores," Science 291:1021-1023 (2001); Featured in Chemical and Engineering News, Feb. 21, 2001.

Chen et al., "Transformation of a Metal-Organic Framework from the NbO to PtS Net," Inorg. Chem. 41:181-183 (2005).

Chen et al., "High H2 Adsorption in a Microporous Metal-Organic Framework with Open-Metal Sites," Angew. Chem. Int. Ed. 44:4745-4749 (2005).

Chen et al., "A Microporous Metal-Organic Framework for Gas-Chomatographic Separation of Alkanes," Angew. Chem. Int. Ed. 45:1390-1393 (2006).

Cho et al., "A metal-organic framework material that functions as an enantioselective catalyst for olefin epoxidation," Chem. Comm. 24:2563-2565 (2006).

Choi et al., "Heterogeneity within Order in Crystals of a Porous Metal Organic Framework," J. Am. Chem. Soc. 133:11920-11923 (2011).

Czaja et al., "Industrial applications of metal-organic frameworks," Chemical Society Reviews 38(5):1284-1293 (2009).

Delgado-Friedrichs et al., "Three-Periodic Nets and Tilings: Regular and Quasiregular Nets," Acta Cryst. A59: 22-27 (2003).

Delgado-Friedrichs et al., "Three-Periodic Nets and Tilings: Semiregular Nets," Acta Cryst. A59:515-525 (2003).

Delgado-Friedrichs et al., "The CdSO4, Rutile, Cooperate and Quartz Dual Nets: Interpenetration and Catenation," Solid State Sciences 5:73-78 (2003).

Delgado-Friedrichs et al., "Reticular Chemistry: Occurrence and Taxonomy of Nets, and Grammar for the Design of Frameworks," Acc. Chem. Res. 38:176-182 (2005).

Delgado-Friedrichs et al. "What Do We Know About Three-Periodic Nets?," J. Solid State Chem. 178: 2533-2554 (2005).

Delgado-Friedrichs et al. "Three-Periodic Nets and Tilings: Edge-Transitive Binodal Structures," Acta Cryst. 62:350-355 (2006).

Delgado-Friedrichs et al., "Taxonomy of Periodic Nets and the Design of Materials," Phys. Chem. 9:1035-1043 (2007).

Deng et al., "Multiple Functional Groups of Varying Ratios in Metal-Organic Frameworks," Science 327:846-850 (2010).

Deng et al., "Robust dynamics" Nature Chem. 2:439-443 (2010).

Doonan et al., "Isoreticular Metalation of Metal-Organic Frameworks," J. Am. Chem. Soc. 131:9492-9493 (2009).

Doonan, C., "Hydrogen Storage in Metal-Organic Frameworks," Annual Merit Review Proceedings of DOE Hydrogen Program, May 22, 2009.

Duren et al., "Design of New Materials for Methane Storage," Langmuir 20:2683-2689 (2004).

Eddaoudi et al., "Design and Synthesis of Metal-Organic Frameworks with Permanent Porosity," in Topics in Catalysis, G. A. Somorjai and J. M. Thomas, Eds., 9:105 (1999).

Eddaoudi et al., "Highly Porous and Stable Metal-Organic Framework: Structure Design and Sorption Properties," J. Am. Chem. Soc. 121:1391-1397 (2000).

Eddaoudi et al., "Porous Metal-Organic Polyhedra: 25 Å Cuboctahedron Constructed from Twelve Cu2(CO2)4 Paddle-Wheel Building Blocks," J. Am. Chem. Soc. 123:4368-4369 (2001).

Eddaoudi et al., "Modular Chemistry: Secondary Building Units as a Basis for the Design of Highly Porous and Robust Metal-Organic Carboxylate Frameworks" Acc. Chem. Res. 34:319-330 (2001).

Eddaoudi et al., "Geometric Requirements and Examples of Important Structures in the Assembly of Square Building Blocks," Proc. Natl. Acad. Sci. 99:4900-4904 (2002).

Eddaoudi et al., "Systematic Design of Pore Size and Functionality in Isoreticular Metal-Organic Frameworks and Application in Methane Storage," Science 295:469-472 (2002): Featured in (1) Chemical and Engineering News, Jan. 21, 2002, and (2) Chemical Insight magazine, Nov. 15, 2002.

Eddaoudi et al., "Cu2[o-Br-C6H3(CO2)2]2(H2O)2•(DMF)8(H2O)2: A Framework Deliberately Designed to have the NbO Structure Type," J. Am. Chem. Soc.124:376-377 (2002).

Ferragut et al., "Positronium Formation in Porous Materials for Antihydrogen Production," J. Phys. Conf. Ser. 225:1-8 (2010).

Furukawa et al., "Crystal Structure, Dissolution, and Deposition of a 5 nm Functionalized Metal-Organic Great Rhombicuboctahedron," J. Am. Chem. Soc. 128:8398-8399 (2006).

(56) References Cited

OTHER PUBLICATIONS

Furkawa et al., "Independent verification of the saturation hydrogen uptake in MOF-177 and establishment of a benchmark for hydrogen adsorption in metal-organic frameworks," J. Mater. Chem. 17:3197-3204 (2007).
Furukawa et al., "Control of Vertex Geometry, Structure Dimensionality, Functionality, and Pore Metrics in the Reticular Synthesis of Crystalline Metal-Organic Frameworks and Polyhedra," J. Am. Chem. Soc.130:11650-11661 (2008).
Furukawa et al., "Ultra-High Porosity in Metal-Organic Frameworks," Science 239:424-428 (2010).
Novoa, Carlos, International Search Report and Written Opinion, PCT/US2010/021201, European Patent Office, Apr. 27, 2010.
Carlucci et al., "Nanoporous three-dimensional networks topologically related to Cooperite from the self-assembly of copper(I) centres and the "square-planar" building block 1, 2, 4, 5-tetracyanobenzene," New J. Chem., 1999, pp. 397-401, vol. 23.
Holler et al., "The First Dintrile Frameworks of the Rare Earth Elements: 3[LnCL3(1,4-Ph(CN2)] and 3[Ln2CL6(1,4-Ph(CN)2)], Ln=Sm, Gd, Tb, Y; Access to Novel Metal-Organic Frameworks by Solvent Free Synthesis in Molten 1,4-Benzodinitrile," Inorganic Chemistry, 2008, pp. 10141-10149, vol. 47, No. 21.
Niu et al., "Syntheses and structural characterization of the one dimensional polymers: 1[Rh2(OAc)4(NCPhCN)S; S=CH3COCH3, CH3OH, C2H5OH, C4H8O and C6H6," Polyhedron, 1998, pp. 4079-4089, vol. 17, No. 23-24.
Glover et al., "MOF-74 building unit has a direct impact on toxic gas adsorption," J. Chem. Eng. Sci. 66:163-170 (2011).
Gould et al., "The Amphidynamic Character of Crystalline MOF-5: Rotational Dynamics in a Free-Volume Environment," J. Am. Chem. Soc. 130:3246-3247 (2008).
Goebel, Matthias, Supplemental European Search Report and Written Opinion for EP08826913. Date of Completion of Search and Written Opinion: Nov. 10, 2010.
Goebel, Matthias, Supplemental European Search Report and Written Opinion for EP08754337. Date of Completion of Search and Written Opinion: Dec. 3, 2010.
Grzesiak et al., "Polymer-Induced Heteronucleation for the Discovery of New Extended Solids," Angew. Chem. Int. Ed. 45:2553-2556 (2006).
Halper et al., "Topological Control in Heterometallic Metal-Organic Frameworks by Anion Templating and Metalloligand Design," J. Am. Chem. Soc. 128:15255-15268 (2006).
Han, SS et al., "Improved designs of metal-organic frameworks for hydrogen storage" Angew. Chem. Int. Ed. 2007, 46, pp. 6289-6292.
Hayashi et al., "Zeolite A Imidazolate Frameworks," Nature Materials 6:501-506 (2007).
Hexiang et al., "Multiple Functional Groups of Varying Rations in Metal-Organic Frameworks," Science 327 (5967):846-850 (2010).
Honda, Masashi, International Preliminary Report on Patentability for PCT/US2008/051859. Date of Issuance of the Report: Jul. 28, 2009.
Howe, Patrick. International Search Report and Written Opinion for PCT/US2009/068849. Date of Mailing of the Search Report: 04/06/201.
Howe, Patrick. International Search Report and Written Opinion for PCT/US2010/022777. Date of Mailing: Jun. 7, 2010.
Huang et al., "Thermal Conductivity of Metal-Organic Framework 5 (MOF-5): Part II. Measurement," Int. J. Heat Mass Transfer 50:405-411 (2007).
Isaeva et al., "Metal-organic frameworks-new materials for hydrogen storage," Russian Journal of General Chemistry 77(4):721-739(2007).
Jeong et al., "Asymmetric Catalytic Reactions by NbO-Type Chiral Metal-Organic Frameworks," Chem. Sci. 2:877-882 (2011).
Kaye et al., "Impact of Preparation and Handling on the Hydrogen Storage Properties of Zn4O(1,4-benzenedicarboxylate)3 (MOF-5)," J. Am. Chem. Soc. 129:14176-14177 (2007).

Kim et al., "Assembly of Metal-Organic Frameworks From Large Organic and Inorganic Secondary Building Units: New Examples and Simplifying Principles for Complex Structures," J. Am. Chem. Soc. 123:8239-8247 (2001).
Kim, Su Mi, International Search Report and Written Opinion, Date of Mailing: Feb. 24, 2010, International Application No. PCT/US09/46463.
Kim, Su Mi, International Search Report and Written Opinion for PCT/US2009/068731. Date of Mailing: Aug. 19, 2010.
Kim, Su Mi. International Search Report for PCT/US2010/039154. Date of Mailing: Feb. 23, 2011.
Klaes, Daphne. International Search Report and Written Opinion for PCT/US2010/021201. Date of Mailing: Apr. 27, 2010.
Kyoungmoo et al., "A Crystalline Mesoporous Coordination Copolymer with High Microporosity," Angew. Chem. Int. Ed. 47(4):677-680 (2008).
Lee, Ji Min. International Search Report for PCT/US2010/039284. Date of Mailing: Feb. 22, 2011.
Li et al., "Coordinatively Unsaturated Metal Centers in the Extended Porous Framewokr of Zn3(BDC)3-6CH3OH (BDC= 1,4-Benzenedicarboxylate)," J. Am. Chem. Soc. 2186-2187 (1998).
Li et al., "Establishing Microporosity in Open Metal-Organic Frameworks: Gas Sorption Isotherms for Zn(BDC) (BDC=1,4-Benzenedicaroxylate)," J. Am. Chem. Soc. 120:8571-8572 (1998).
Li et al., "Porous Germanates: Synthesis, Structure and Inclusion Properties of Ge7O14.5F2-[(CH3)2NH2]3(H2O) O.86," J. Am. Chem. Soc. 120:8567-8568 (1998).
Li et al., "Transformation of Germanium Dioxide to 4-Connected Porous Germanate Net," J. Am. Chem. Soc. 10569-10570 (1998).
Li et al., "An Open-Framework Germanate with Polycubane-Like Topology," Angew. Chem. INt. Ed., 38:653-655 (1999).
Li et al., "Supertetrahedral Sulfide Crystals with Giant Cavities and Channels," Science 283:1145-1147 (1999).
Li et al., "Non-interpenetrating Indium Sulfide with a Supertetrahedral Cristobalite Famework," J. Am. Chem. Soc. 121:6096-6097 (1999).
Li et al., "Design and Synthesis of an Exceptionally Stable and Highly Porous Metal-Organic Framework," 402:276-279 (1999); Featured in (1) Chemical and Engineering News (Nov. 22, 1999) and (2) Science News (Nov. 20, 1999).
Li et al., "Ge2ZrO6F2 (H2DAB)H2O: A 4-Connected Microporous Material with "Bow Tie" Building Units and an Exceptional Proportion of 3-Rings," J. Am. Chem. Soc. 122:12409-12410 (2000).
Li et al., "20 A [Cd4In16S35]14-Supertetrahedral T4 Clusters as Building Units in Decorated Cristobalite Frameworks," J. Am. Chem Soc. 123:4867-4868 (2001).
Li et al., "[Cd16In64S134]44-: 31-Å Tetrahedron with a Large Cavity," Angew. Chem. Int. Ed., 42:1819-1821 (2003).
Li et al., "A metal-organic framework replete with ordered donor-acceptor catenanes," Chem. Commun. 46:380-382 (2010).
Li et al., "A Catenated Strut in a Catenated Metal-Organic Framework," Angew. Chem. Int. Ed. 49:6751-6755 (2010).
Linder, Nora. International Preliminary Report on Patentability for PCT/US2010/022777. Date of Mailing: Aug. 11, 2011.
Llabres et al., "MOFs as catalysts: Activity, reusability and shape-selectivity of a Pd-containing MOF," JOurnal of Catalysis 250(2):294-298, (2007).
Long et al., "The Pervasive Chemistry of Metal-Organic Frameworks," Chem. Soc. Rev. 38:1213-1214 (2009).
Lu et al., "Synthesis and Structure of Chemically Stable Metal-Organic Polyhedra," J. Am. Chem. Soc. 131:(35) 12532-12533 (2009).
Michalitsch, Richard. International Search Report and Written Opinion for PCT/US2009/069700. Date of Mailing: May 7, 2010.
Millward et al., "Metal-Organic Frameworks with Exceptionally High Capacity for Storage of Carbon Dioxide at Room Temperature," J. Am. Chem. Soc. 127:17998-17999 (2005).
Morris et al., "Crystals as Molecules: Postsynthesis Covalent Functionalization of Zeolitic Imidazolate Frameworks," J. Am. Chem. Soc. 130:12626-12627 (2008).

(56) References Cited

OTHER PUBLICATIONS

Morris et al., "A Combined Experimental—Computational Investigation of Carbon Dioxide Capture in a Series of Isoreticular Zeolitic Imidazolate Frameworks," J. Am. Chem. Soc. 132:11006-11008 (2010).

Morris et al., "Postsynthetic Modification of a Metal-Organic Framework for Stabilization of a Hemiaminal and Ammonia Uptake," Inorg. Chem. 50:6853-6855 (2011).

Moyse, Ellen, International Preliminary Report on Patentability and Written Opinion, Date of Issuance of Report: Nov. 17, 2009, International Application No. PCT/US08/006008.

Mulhausen, Dorothee. International Preliminary Report on Patentability for PCT/US2009/069700. Date of Mailing: Jul. 7, 2011.

Mulhausen, Dorothee. International Preliminary Report on Patentability for PCT/US2010/021201. Date of Mailing Jul. 28, 2011.

Natarajan et al., "Non-carboxylate based metal-organic frameworks (MOFs) and related aspects," Current Opinion in Solid State and Materials Science 13(3-4):46-53 (2009).

Ni et al,. "Porous Metal-Organic Truncated Octahedron Constructed from Paddle-Wheel Squares and Terthiophene Links," J. Am. Chem. Soc. 127:12752-12753 (2005).

\* cited by examiner

CONDUCTIVE ORGANOMETALLIC FRAMEWORK

CROSS REFERENCE TO RELATED APPLICATIONS

This application is a U.S. National Stage Application filed under 35 U.S.C. §371 and claims priority to International Application No. PCT/US10/21201, filed Jan. 15, 2010, which application claims priority under 35 U.S.C. §119 from Provisional Application Ser. No. 61/144,742, filed Jan. 15, 2009, the disclosure of which is incorporated herein by reference.

TECHNICAL FIELD

The disclosure provides a conductive organometallic framework. The disclosure also provides sensors and catalysts comprising an organometallic framework of the disclosure.

BACKGROUND

Ligand-stabilized metal complexes (i.e., organometallic complexes) are useful as catalysts, additives, stoichiometric reagents, monomers, solid state precursors, therapeutic reagents and drugs.

SUMMARY

The disclosure provides organometallic frameworks, compositions comprising such frameworks and uses of the frameworks for catalysis and gas sensing.

In one embodiment of the disclosure an organometallic framework is provided comprising at least two metal or metal ions linked by a linking ligand, wherein the linking ligand comprises at least one cyano group. In one embodiment, the linking ligand is a diisocyanide. In yet another embodiment, the organometallic framework comprises a general structure $(M-R_1-C\equiv N-R_2-N\equiv C-R_1-M)_n$ wherein $R_1$ can be absent (e.g., $(M-C\equiv N-R_2-N\equiv C-M)_n$) and wherein when $R_1$ is present comprises an alkyl (e.g., a lower alkyl) and $R_2$ is an alkyl or cycloalkyl group comprising 1 to 20 carbon atoms, an aryl group comprising 1 to 5 phenyl rings, a fused aromatic group comprising 2 to 6 rings or a porphine group comprising 20 to 80 carbon atoms, and n is 1 or more. In one embodiment, the backbone/cyano-substructure can be modified with an ancillary ligand system comprising organic substituents, and therefore provide an opportunity to modify the shape, electronic and chemical properties of the pores and structure of the organometallic framework. In one embodiment, the organometallic framework of the disclosure comprises a plurality of metal or metal ions separated by a diisocyanide to form a porous framework. In yet another embodiment, the porous organometallic framework of the disclosure comprises pores useful for catalysis. In yet another embodiment, the metals of the organometallic framework are homogeneous. In another embodiment, the diisocyanide linking ligands are homogeneous.

In one embodiment of the disclosure the framework comprises a network where the metal or metal ion is in the corner and a cyano-ligand is a bridge that connects between two metal-corners.

The details of one or more embodiments of the invention are set forth in the accompanying drawings and the description below. Other features, objects, and advantages of the invention will be apparent from the description and drawings, and from the claims.

DETAILED DESCRIPTION

As used herein and in the appended claims, the singular forms "a," "and," and "the" include plural referents unless the context clearly dictates otherwise. Thus, for example, reference to "a framework" includes a plurality of such frameworks and reference to "the metal ion" includes reference to one or more metal ions and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

The disclosure provides organometallic frameworks, compositions comprising such frameworks and uses of the frameworks for catalysis and gas sensing.

The disclosure provides organometallic frameworks comprising a plurality of metal or metal ions linked by a linking ligand that produces a pi-back bonding (i.e., pi-back donation) suitable for catalysis or as an electrically conductive material.

Pi-back bonding is a concept from chemistry, in which electrons move from an atomic orbital on one atom to a $\pi^*$ anti-bonding orbital on another atom or ligand. It is especially common in the organometallic chemistry of transition metals with multi-atomic ligands such as carbon monoxide, ethylene or the nitrosonium cation. Electrons from the metal are used to bond to the ligand, in the process relieving the metal of excess negative charge.

The electrons are taken from a d-orbital of the metal, and usually placed into an anti-bonding molecular orbital of the ligand, which causes the bond order of that ligand to decrease. This leads to a decrease in the vibrational frequency of the bond, which can be measured using IR spectroscopy. Although the bond-order within the ligand is decreased by this process, the metal-ligand bond order is increased.

In one embodiment of the disclosure an organometallic framework is provided comprising at least two metal or metal ions linked by a linking ligand, wherein the linking ligand comprises at least one cyano group. In one embodiment, the linking ligand is a diisocyanide. In yet another embodiment, the organometallic framework comprises a general structure $(M-R_1-C\equiv N-R_2-N\equiv C-R_1-M)_n$ wherein $R_1$ can be absent (e.g., $(M-C\equiv N-R_2-N\equiv C-M)_n$) and wherein when $R_1$ is present $R_1$ comprises an alkyl (e.g., a lower alkyl) and $R_2$ is an alkyl or cycloalkyl group comprising 1 to 20 carbon atoms, an aryl group comprising 1 to 5 phenyl rings, a fused aromatic group comprising 2 to 6 rings or a porphine group comprising 20 to 80 carbon atoms or a heteroaryl, and n is 1 or more.

In one embodiment, the organometallic framework of the disclosure comprises a plurality of metal or metal ions (M) separated by a linking ligand comprising (—R$_1$—C≡N—R$_2$—N≡C—R$_1$—)$_n$ wherein R$_1$ can be present or absent (e.g., —C≡N—R$_2$—N≡C—)$_n$ and wherein when R$_1$ is present R$_1$ comprises an alkyl (e.g., a lower alkyl) and R$_2$ is an alkyl or cycloalkyl group comprising 1 to 20 carbon atoms, an aryl group comprising 1 to 5 phenyl rings, a fused aromatic group comprising 2 to 6 rinds or a porphine group comprising 20 to 80 carbon atoms, and n is 1 or more to form a porous framework. Such a porous organometallic framework of the disclosure comprises pores useful for catalysis. In yet another embodiment, the metals of the organometallic framework are homogeneous. In another embodiment, the linking ligands are homogeneous.

In one embodiment, the organometallic framework of the disclosure comprises a plurality of metal or metal ions separated by a diisocyanide to form a porous framework. In yet another embodiment, the porous organometallic framework of the disclosure comprises pores useful for catalysis. In yet another embodiment, the metals of the organometallic framework are homogeneous. In another embodiment, the diisocyanide linking ligands are homogeneous.

In the embodiment where the organometallic frameworks of the disclosure comprises a diisocyanide, the framework comprises a pi-back bonding, also called n back donation, suitable for catalysis or as an electrical conductive material.

A "linking moiety" or "linking ligand" refers to a monodentate or polydentate compound that bind a transition metal or a plurality of transition metals, respectively. Generally a linking moiety comprises a substructure covalently linked to an alkyl or cycloalkyl group, comprising 1 to 20 carbon atoms, an aryl group comprising 1 to 5 phenyl rings, or an alkyl or aryl amine comprising alkyl or cycloalkyl groups having from 1 to 20 carbon atoms or aryl groups comprising 1 to 5 phenyl rings, and in which a linking cluster (e.g., a multidentate function groups) are covalently bound to the substructure. A cycloalkyl or aryl linked to a substructure may comprise 1 to 5 rings that comprise either of all carbon or a mixture of carbon with nitrogen, oxygen, sulfur, boron, phosphorus, silicon and/or aluminum atoms making up the ring. The substructure comprises at least one cyano group (e.g., the linking ligand can be a diisocyanide).

For example, an organometallic framework of the disclosure can comprise the general structure M-L-M, wherein L is linking moiety comprising a cyano group (e.g., a cyano-linking group substructure) such as, for example, a diisocyanide substructure and M is a transition metal. The substructure may further comprise additional modifying groups useful for modifying pore size or specificity. For example, useful diisocyanides include those selected from 1,3-diisocyanopropane, 1,4-diisocyanobutane, 2,5-dimethyl-2,5-diisocyanohexane, cis-1-isocyano-4(2-isocyanopropyl)cyclohexane, 2,4-diisocyanopentane, 2-alkyl-1,3-diisocyanopropane, 1-isocyanobenzylisocyanamide, 1,2-diisocyanobenzene, 1,4-diisocyanocyclohexane, 1,8-diisocyanonaphthalene, 1,8-diisocyanofluorene, m-isocyanophenyl sulfone, 1,3-diisocyano-2,2,4,4,-tetramethylcyclobutane, 1,3-diisocyano-2-hydroxy propane, 2,4-diisocyanobutane sulfonic acid, 1,4-diisocyanobenzene, α,α'-diisocyano-m-xylene and any combination thereof.

As used herein, a line in a chemical formula with an atom on one end and nothing on the other end means that the formula refers to a chemical fragment that is bonded to another entity on the end without an atom attached. Sometimes for emphasis, a wavy line will intersect the line.

In one aspect, the linking moiety substructure comprises a cyano-group modified to include additional groups selected from any of the following:

-continued wherein $R_1$, $R_2$, $R_3$, $R_4$=$NH_2$, CN, OH, =O, =S, SH, P, Br, CL, I, F, wherein X=1, 2, or 3. Such additional groups can be used to modify and tune the pore sizes and 3D structure of the framework. Typically, the framework comprises a network where the metal or metal ion is in the corner and a cyano-ligand is a bridge that connects between two metal-corners. For example, isocyanides have similarity in chemistry with carbonyl ligands and many of the organometallic catalysts in use are based on metal-carbonyls, thus the organometallic framework of the disclosure can be used as a heterogeneous organometallic catalyst for various catalytic reactions.

Any number of metal or metal ions can be used in the organometallic framework. For example, the metal or metal ion can comprise a member selected from the group consisting of Ti, $V^-$, V, Cr, $Cr^{2+}$, $Mn^-$, Mn, $Mn^+$, $Fe^{2-}$, Fe, $Fe^{2+}$, $Fe^{3+}$, $Co^-$, Co, $Co^{2+}$, $Co^{3+}$, Ni, $Ni^{2+}$, Cu, $Cu^+$, $Cu^{2+}$, Zn, $Zn^{2+}$, Zr, Nb, $Nb^-$, Mo, $Mo^{2+}$, Ru, $Ru^{2+}$, $Ru^{3+}$, Rh, $Rh^{2+}$, $Rh^{3+}$, Pd, $Pd^{2+}$, Ag, $Ag^+$, Cd, $Cd^{2+}$, Hf, $Ta^-$, Ta, W, $W^{2+}$, Re, $Re^+$, Os, $Os^+$, $Os^{2+}$, $Os^{3+}$, $Os^{4+}$, Ir, $Ir^{2+}$, Pt, $Pt^{2+}$, Au, $Au^+$, $Au^{3+}$; along with the corresponding metal salt counteranion. For example, in a specific embodiment described below, the metal is rhodium and the diisocyanide is 1,4-diisocyanobenzene.

A named R group will generally have the structure which is recognized in the art as corresponding to R groups having that name. These definitions are intended to supplement and illustrate, not preclude, the definitions known to those of skill in the art.

The term "alkyl" is used herein to refer to a branched or unbranched, saturated or unsaturated, monovalent hydrocarbon radical. When the alkyl group has from 1-6 carbon atoms, it is referred to as a "lower alkyl." Suitable alkyl include, for example, methyl, ethyl, n-propyl, 1-propyl, 2-propenyl (or allyl), n-butyl, t-butyl, i-butyl (or 2-methylpropyl), and the like. As used herein, the term encompasses "substituted alkyls."

"Substituted alkyl" refers to alkyl as just described including one or more functional groups such as lower alkyl, aryl, acyl, halide (e.g., alkyl halides), hydroxyl, amino, alkoxy, alkylamino, acylamino, acyloxy, aryloxy, aryloxyalkyl, mercapto, both saturated and unsaturated cyclic hydrocarbons, heterocycles and the like. These groups may be attached to any carbon of the alkyl moiety.

The term "aryl" is used herein to refer to an aromatic substituent which may be a single aromatic ring or multiple aromatic rings which are fused together, linked covalently, or linked to a common group such as a methylene or ethylene moiety. The common linking group may also be a carbonyl as in benzophenone. The aromatic ring(s) may include substituted or unsubstituted phenyl, naphthyl, biphenyl, diphenylmethyl and benzophenone among others.

"Substituted aryl" refers to aryl as just described including one or more functional groups such as lower alkyl, acyl, halide, alkyl halide, hydroxyl, amino, alkoxy, alkylamino, acylamino, acyloxy, mercapto and both saturated and unsaturated cyclic hydrocarbons which are fused to the aromatic ring(s), linked covalently or linked to a common group such as a methylene or ethylene moiety.

The term "acyl" is used to describe a ketone substituent, —C(O)R, where R is alkyl or substituted alkyl, aryl or substituted aryl as defined herein.

The term "amino" is used herein to refer to the group —NRR', where R and R' may independently be hydrogen, lower alkyl, substituted lower alkyl, aryl, substituted aryl or acyl. When an amino group is bonded to a metal through the nitrogen atom, it is referred to as an "amido" bond.

The term "alkoxy" is used herein to refer to the —OR group, where R is an alkyl, substituted lower alkyl, aryl, substituted aryl, wherein the substituted alkyl, aryl, and substituted aryl groups are as described herein. Suitable alkoxy radicals include, for example, methoxy, ethoxy, phenoxy, substituted phenoxy, benzyloxy, phenethyloxy, t-butoxy, etc.

As used herein, the term "mercapto" defines moieties of the general structure R—S—R' wherein R and R' are the same or different and are alkyl, aryl or heterocyclic as described herein.

The term "saturated cyclic hydrocarbon" denotes groups such as the cyclopropyl, cyclobutyl, cyclopentyl, etc., and substituted analogues of these structures.

The term "unsaturated cyclic hydrocarbon" is used to describe a monovalent nonaromatic group with at least one double bond, such as cyclopentene, cyclohexene, etc. and substituted analogues thereof.

The term "heteroaryl" as used herein refers to aromatic rings in which one or more carbon atoms of the aromatic ring(s) are substituted by a heteroatom such as nitrogen, oxygen or sulfur. Heteroaryl refers to structures which may be a single aromatic ring, multiple aromatic ring(s), or one or more aromatic rings coupled to one or more nonaromatic ring(s). In structures having multiple rings, the rings can be fused together, linked covalently, or linked to a common group such as a methylene or ethylene moiety. The common linking group may also be a carbonyl as in phenyl pyridyl ketone. As used herein, rings such as thiophene, pyridine, isoxazole, phthalimide, pyrazole, indole, furan, etc. or benzo-fused analogues of these rings are defined by the term "heteroaryl."

"Heteroarylalkyl" defines a subset of "alkyl" wherein the heteroaryl group is attached through an alkyl group as defined herein.

"Substituted heteroaryl" refers to heteroaryl as just described wherein the heteroaryl nucleus is substituted with one or more functional groups such as lower alkyl, acyl, halide, alkyl halide (e.g., $CF_3$), hydroxyl, amino, alkoxy, alkylamino, acylamino, acyloxy, mercapto, etc. Thus, substituted analogues of heteroaromatic rings such as thiophene, pyridine, isoxazole, phthalimide, pyrazole, indole, furan, etc. or benzo-fused analogues of these rings are defined by the term "substituted heteroaryl."

"Substituted heteroarylalkyl" refers to a subset of "substituted alkyls" as described above in which an alkyl group, as defined herein, links the heteroaryl group to the nucleus.

The term "heterocyclic" is used herein to describe a monovalent saturated or unsaturated nonaromatic group having a single ring or multiple condensed rings from 1-12 carbon atoms and from 1-4 heteroatoms selected from nitrogen, phosphorous sulfur or oxygen within the ring. Such heterocycles are, for example, tetrahydrofuran, morpholine, piperidine, pyrrolidine, etc.

The term "substituted heterocyclic" as used herein describes a subset of "heterocyclics" wherein the heterocycle nucleus is substituted with one or more functional groups such as alkyl, acyl, halide, alkyl halide, hydroxyl, amino, alkoxy, alkylamino, acylamino, acyloxy, mercapto, etc.

As used herein, the term "catalyst" refers to a compound which speeds a chemical reaction or causes it to occur. The catalysts of the disclosure are formally organometallic compounds.

Heterogeneous catalysis refers to the process wherein the catalyst is in a different phase relative to the reactants. Typically in heterogeneous catalysis one or more of the reactants must diffuse to the catalyst surface and adsorb onto it. After reaction, the products must desorb from the surface and diffuse away from the solid surface. Porous frameworks, for example, have found utility as catalysts because their surface areas may be in excess of 1000 $m^2/g$, which increases the probability that a reactant molecule in solution will come in contact with the catalyst surface and adsorb. If diffusion rates are not taken into account, the reaction rates for various reactions on surfaces depend solely on the rate constants and reactant concentrations. Accordingly, catalysis may be heterogeneous or homogeneous. It will be appreciated by those skilled in the art of catalysis that the aforementioned process conditions may vary depending on the particular reaction, the desired product, the equipment used, and the like.

Classically, compounds having bonds between one or more metal atoms and one or more carbon atoms of an organic group are defined as "organometallic compounds". For the purposes of this application, "organometallic" is defined to include all ancillary ligand stabilized metallic complexes regardless of presence or absence of a metal-carbon bond.

The organometallic frameworks of the disclosure are suitable catalyst materials due to their pore size and/or modification that render the designable for specific catalytic reactions. For example, the framework comprising a cyano-substructure modified with a particular R-group as described above can used to link metal or metal ions, wherein the pores of the framework comprise R-groups that extend into the pores rendering them size or charge designed for a particular substrate.

The disclosure further provides sensors comprising an organometallic framework of the disclosure. Such sensors include, for example, a porous sensor material comprising a framework having a metal or metal ion linked to at least one other metal ion wherein the linking ligand provides pi-back bonding, wherein the framework is disposed between conductive leads and undergoes a change in resistance when the porous material adsorbs or absorbs an analyte. The change in the electrical resistance between the leads can be related to the sorption of an analyte to the porous sensor material. The materials of the disclosure are particularly suited to electrical conductivity measurements due to the pi-back bonding caused by the linking ligands of the disclosure. For example, such a sensor will comprise a material having the general structure In yet another embodiment, the organometallic framework comprises a general structure $(M-R_1-C{\equiv}N-R_2-N{\equiv}C-R_1-M)_n$ wherein $R_1$ can be absent (e.g., $(M-C{\equiv}N-R_2-N{\equiv}C-M)_n$) and wherein when $R_1$ is present $R_1$ comprises an alkyl (e.g., a lower alkyl) and $R_2$ is an alkyl or cycloalkyl group comprising 1 to 20 carbon atoms, an aryl group comprising 1 to 5 phenyl rings, a fused aromatic group comprising 2 to 6 rings or porphine group comprising 20 to 80 carbon atoms, and n is 1 or more.

Another type of sensor includes, for example, a crystalline colloidal array (CCA) as disclosed in U.S. Pat. No. 5,854,078 (the disclosure of which is incorporated herein by reference). Such sensors undergo a volume change in response to a specific analyte species. As the sensors are modulated in size the lattice spacing of the CCA embedded therein can change as well. The light diffraction, therefore, indicates the presence or absence of the analyte that causes the sensing material to change. Yet another type of sensor includes those wherein the sensors produce a spectral recognition patterns when an analyte is present. In this embodiment the sensor material changes in optical properties, whether by density or through a change in excitation or absorbance wavelengths.

Any number of sensor combinations comprising a porous framework of the disclosure or any number of transduction modalities can be used. For example, each individual sensor can provide a signal (e.g., a transduced signal indicative of the presence of an analyte) or a plurality of signals from an array of sensors can be used to identify an analyte of interest in a fluid. The signal transduction mechanism through which the analyte or molecule produces a signal is potentially quite broad. These include arrays of surface acoustic wave devices, quartz crystal micro-balances, dye-coated fiber optics, resistometric, electrochemical, and others modalities readily identifiable to those skilled in the art. Accordingly, transduction mechanisms include, for example optical, electrical, and/or resonance.

The diversity of the sensors of the disclosure comprising a metal and a ligand having a cyano group (e.g., a diisocyanide ligand) that are useful in obtaining libraries for various catalytic process or sensor systems.

In one embodiment, the disclosure provides a sensing platform based on using a sensitive layer made from organometallic framework of the disclosure. The framework is a porous nanostructure that readily adsorb/desorb an analyte which can be sensed via various transducing methods.

The organometallic framework of the disclosure has the properties that the pores can be tuned to match the prerequisites for a given analyte or substrate based upon modification of the R groups of the ligand. Tuneable properties include, but are not limited to, pore size, pore volume, polarity, magnetic properties, chemical environment (e.g., functional groups, metal coordination sites), and geometry of binding sites (e.g., introducing pockets for the analyte and the like).

An organometallic material of the disclosure can be used as a sensing material either alone or as a combination with inorganic materials, organic materials, electrical conductive materials (e.g., inorganic conductors or organic conductors), polymers (e.g., conductive or non-conductive polymers). For example, an organometallic framework of the disclosure can be used in conductometric sensor wherein transducers such as interdigtial electrode transducers can be used or optical transducers such as those comprising an optical path with a source and detector separated by the sensing material of the disclosure are used to sense an analyte.

The disclosure provides a class of porous frameworks that are based on the metal-carbon bond to exploit its application in heterogeneous organometallic catalysis (C—C coupling reactions, hydrogenation, carbonylation, polymerization, and the like, as well as gas sensing.

A two-dimensional rhodium-based conductive coordination polymer has been developed that shows electrical conductivity. Furthermore a molybdenum and 1,4-diisocyanobenzene has been generated. The organometallic framework is based on a network where the metal (or metal ion) is at the corner, and a diisocyanide ligand is a bridge that connects between two metal-corners. Isocyanides have much similarity in chemistry with a carbonyl ligand, and many of the organometallic catalysts used today are based on metal-carbonyls. Thus the organometallic framework can be used as a heterogeneous organometallic catalyst for various catalyses.

Metal-isocyanide bonds carry out pi-back-bonding; hence when the isocyanide is connected to a delocalized system the electronic communication from the metal-link-metal is possible. This phenomenon causes an electric conductivity which is useful in gas sensors.

The organometallic frameworks of the disclosure can be used as catalysts and gas sensors for specific purposes by designing the framework with specific metals or metal ions and/or linking ligands having function groups useful for defining the pore size, charge and characteristics.

Advantages of the organometallic framework of the disclosures include the use as heterogeneous catalysts having high surface area thereby increasing the catalytic rate and the products are easily recovered. In addition the gas-sensing embodiments provide for designing sensors with specificity suing appropriate metal and ligands.

The organometallic frameworks of the disclosure can be synthesized by mixing the solutions that contain the metal precursor and the ligand in an inert atmosphere. The preparation of the frameworks are typically carried out in a non-aqueous system. The solvent may be polar or nonpolar as the case may be. The solvent may be the templating agent or the optional ligand containing monodentate function group. Examples of solvents include n-alkanes, such as pentane, hexane, benzene, toluene, xylene, chlorobenzene, nitrobenzene, cyanobenzene, aniline, naphthalene, napthas, n-alcohols such as methanol, ethanol n-propanol, isopropanol, acetone, 1,2, dichloroethane, methylene chloride, chloroform, carbon tetrachloride, diethyl ether, 1,4 dioxane, tetrahydrofuran, dimethylformamide, dimethylsulfoxide, N-methlpyrollidone, dimethylacetamide, diethylformamide, thiophene, pyridine, ethanolamine, triethylamine, ethylenediamine, and the like. Those of skill in the art can readily determine an appropriate solvent based on the starting reactants and the choice of solvent is not believed to be critical in obtaining the organometallic framework materials of the disclosure.

The templating agents employed in the disclosure are added to the reaction mixture for the purpose of occupying the pores in the resulting crystalline organometallic framework materials. Examples of possible templating species are: (a) alkyl amines and their corresponding alkyl ammonium salts, containing linear, branched or cyclic aliphatic groups having from 1-20 carbon atoms; (b) aryl amines and their corresponding aryl ammonium salts having from 1 to 5 phenyl rings; (c) alkyl phosphonium salts, containing linear, branched or cyclic aliphatic groups having from 1 to 20 carbon atoms; (d) aryl phosphonium salts, having 1 to 5 phenyl rings; (e) alkyl organic acids and their corresponding salts, containing linear, branched or cyclic aliphatic groups, having from 1 to 20 carbon atoms; (f) aryl organic acids and their corresponding salts, having 1 to 5 phenyl rings; (g) aliphatic alcohols, containing linear, branched or cyclic aliphatic groups, having from 1 to 20 carbon atoms; and (h) aryl alcohols having from 1 to 5 phenyl rings.

The crystallization step is carried out by layering the metal precursor solution and the ligand solution to cause slow layer diffusion, using a temperature gradient or leaving the metal-ligand containing solution at room temperature or in isothermal oven for up to 200 C.

Figure 1:
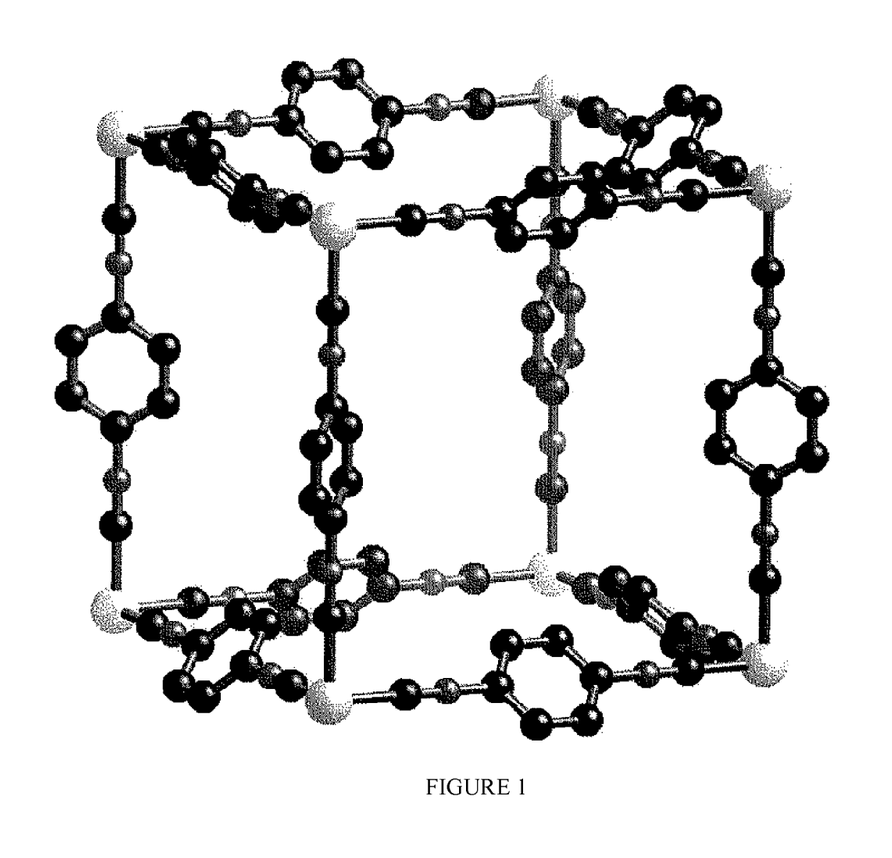
FIG. 1 depicts an example of a crystal structure of the organometallic framework.
Figure 2:
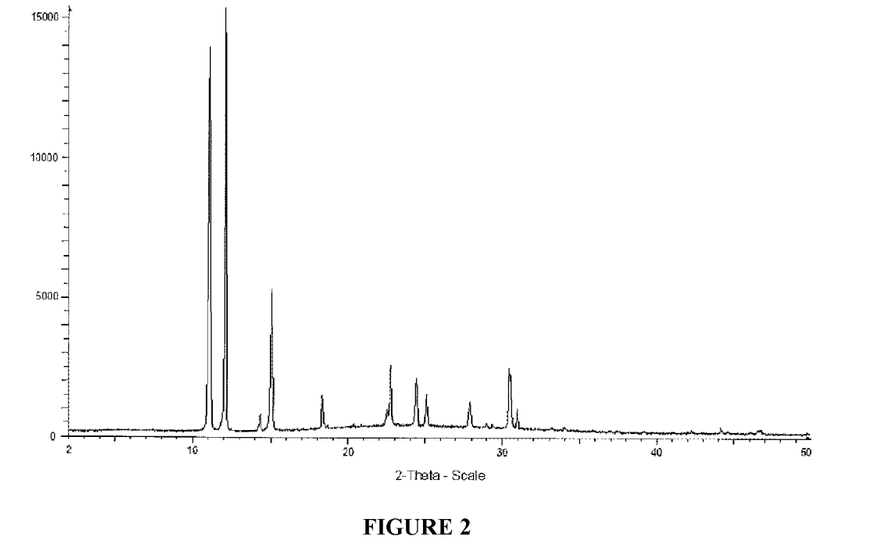
FIG. 2 shows X-ray powder diffraction of a framework of the disclosure.
Figure 3:
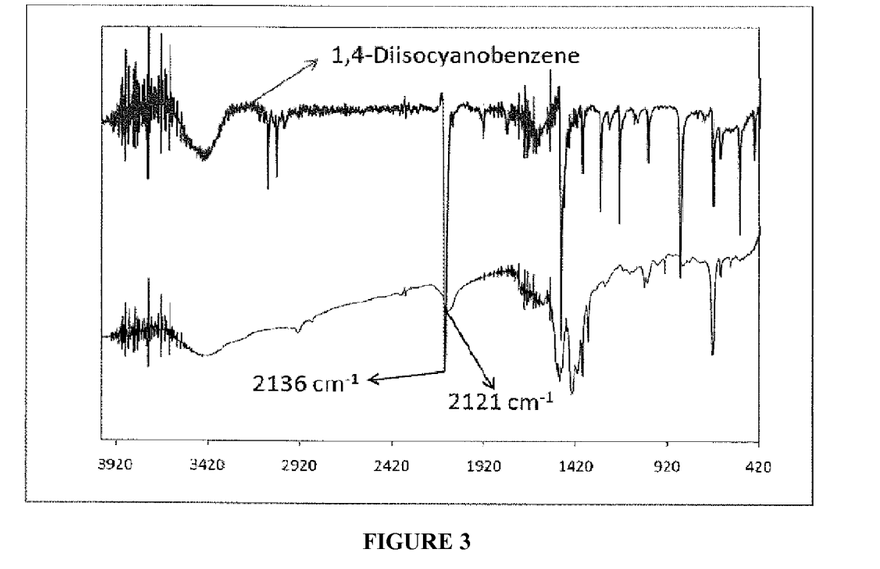
FIG. 3 shows an infrared spectrum of a framework of the disclosure.

FIG. 1 depicts an example of a crystal structure of the organometallic framework. FIG. 2 shows X-ray powder diffraction of a framework of the disclosure. FIG. 3 shows an infrared spectrum of a framework of the disclosure.

A number of embodiments of the invention have been described. Nevertheless, it will be understood that various modifications may be made without departing from the spirit and scope of the invention. Accordingly, other embodiments are within the scope of the following claims.

What is claimed is:

1. An organometallic framework comprising the general structure:

M-L-M, wherein L is a linking ligand consisting essentially of a diisocyanide of the formula $(CN)_2R$, where R is an organic divalent group containing 2 to 20 carbon atoms, and M is a transition metal, and wherein the transition metal is selected from the group consisting of Sc, Ti, V, Cr, Mn, Fe, Co, Ni, Cu, Zn, Y, Zr, Nb, Mo, Tc, Rh, Pd, Ag, Cd, Lu, Hf, Ta, W, Re, Os, Ir, Pt, Au, Hg, Lr, Rf, Db, Sg, Bh, Hs, Mt, Ds, Rg and Uub.

2. The organometallic framework of claim 1, wherein the framework comprises a cage.

3. The organometallic framework of claim 2, wherein the cage comprises at least 4 metal atoms.

4. The organometallic framework of claim 1, wherein R is selected from alkylene, arylene, alkarylene, cycloalkylene, alkylcyoalkylene or alkarylene.

5. The organometallic framework of claim 1, wherein the diisocyanide is selected from the group consisting of 1,3- diisocyanopropane, 1,4-diisocyanobutane, 2,5-dimethyl-2,5-diisocyanohexane, cis-1-isocyano-4(2-isocyanopropyl)cyclohexane, 2,4-diisocyanopentane, 2-alkyl-1,3-diisocyanopropane, 1-isocyanobenzylisocyanamide, 1,2-diisocyanobenzene, 1,4-diisocyanocyclohexane, 1,8-diisocyanonaphthalene, 1,8-diisocyanofluorene, m-isocyanophenyl sulfone, 1,3-diisocyano-2,2,4,4,-tetramethylcyclobutane, 1,3-diisocyano-2-hydroxy propane, 2,4-diisocyanobutane sulfonic acid, 1,4-diisocyanobenzene, α,α'-diisocyano-m-xylene and any combination thereof.

6. The organometallic framework of claim 1, wherein the framework comprise different metals.

7. The organometallic framework of claim 1, wherein the framework comprises a heterogeneous combination of diisocyanide ligands.

8. The organometallic framework of claim 1, wherein the pi-back-bonding is delocalized between metal atoms.

9. The organometallic framework of claim 1, wherein the metal is rhodium and the diisocyanide is 1,4-diisocyanobenzene.

* * * * *